(12) United States Patent
Thakkar et al.

(10) Patent No.: US 7,167,710 B2
(45) Date of Patent: Jan. 23, 2007

(54) METHOD AND APPARATUS FOR MIXED MODE PERSONAL COMMUNICATION

(75) Inventors: Vivek V. Thakkar, Elk Grove Village, IL (US); Guy G. Romano, Elmhurst, IL (US)

(73) Assignee: Motorola, Inc., Schaumburg, IL (US)

( * ) Notice: Subject to any disclaimer, the term of this patent is extended or adjusted under 35 U.S.C. 154(b) by 414 days.

(21) Appl. No.: 10/737,065

(22) Filed: Dec. 16, 2003

(65) Prior Publication Data

US 2004/0127251 A1 Jul. 1, 2004

Related U.S. Application Data

(60) Provisional application No. 60/433,848, filed on Dec. 16, 2002.

(51) Int. Cl.
*H04Q 7/20* (2006.01)
(52) U.S. Cl. ............... 455/450; 455/445; 370/329; 370/352
(58) Field of Classification Search ........ 455/556.1, 455/445, 426.1, 452.1, 414.1, 509–513; 725/62; 379/90.01, 93.01–93.12; 709/227; 348/14.01, 348/14.02; 370/329
See application file for complete search history.

(56) References Cited

U.S. PATENT DOCUMENTS

| | | | | |
|---|---|---|---|---|
| 5,493,609 A * | 2/1996 | Winseck et al. ......... 379/93.08 |
| 6,138,030 A * | 10/2000 | Coombes et al. ........... 455/507 |
| 6,317,609 B1 * | 11/2001 | Alperovich et al. ...... 455/556.1 |
| 6,380,967 B1 * | 4/2002 | Sacca ....................... 348/14.01 |
| 7,092,370 B1 * | 8/2006 | Jiang et al. ................. 370/329 |
| 2002/0055350 A1 * | 5/2002 | Gupte et al. ................ 455/412 |
| 2002/0082029 A1 * | 6/2002 | Ahmad et al. .............. 455/458 |
| 2002/0122401 A1 * | 9/2002 | Xiang et al. ................ 370/338 |
| 2003/0027566 A1 * | 2/2003 | Weiner ....................... 455/426 |
| 2004/0077351 A1 * | 4/2004 | Inoue et al. ................ 455/444 |
| 2006/0033809 A1 * | 2/2006 | Farley ...................... 348/14.01 |

* cited by examiner

*Primary Examiner*—Edward F. Urban
*Assistant Examiner*—Blane J. Jackson
(74) *Attorney, Agent, or Firm*—Scott M. Garrett

(57) ABSTRACT

A method of mixed mode communication in a wireless mobile communication system allows a first user to initially communicate with a second user using a first communication mode (108), such as a voice calling mode. During the use of the first communication mode, the users decide (110) to use a second communication mode to facilitate a different form of communication, such as an image transfer. The communication device then establishes a second communication link (104), and a second mode of communication is then engaged in (118). Upon finishing the second communication mode, (120), the first communication mode remains, or is reestablished (124).

42 Claims, 3 Drawing Sheets

METHOD AND APPARATUS FOR MIXED MODE PERSONAL COMMUNICATION

CROSS REFERENCE TO RELATED APPLICATIONS

This application claims the benefit of U.S. Provisional Application No. 60/433,848 filed, Dec. 16, 2002 and assigned to Motorola, Inc.

TECHNICAL FIELD

This invention relates in general to communication systems, and more particularly communication systems wherein the communication equipment used by users of the systems is capable of more than one mode of communication.

BACKGROUND OF THE INVENTION

Mobile communication devices are in widespread use throughout the world, and are especially popular in metropolitan regions. Initially these devices facilitated mobile telephony, but more recently these devices have been designed to provide many other services. In particular data network services have become very popular and allow users the ability to interact with networks by, for example, sending and receiving email and other text messages, browsing content on wide area networks like the Internet, and so on. In addition, there are at least two major forms of voice communication that in widespread use, which are regular full duplex telephony, and half duplex dispatch calling. Dispatch calling includes both one to one "private" calling and one to many "group" calling. The variety of calling and messaging modes allow a user to select the most appropriate way to communicate with others.

At the same time, developers have been creating applications for use on mobile communication devices that allow users to perform various tasks. For example, presently mobile communication devices having cameras are popular in the marketplace. These devices allow a user to take a picture or even a short video clip with the mobile communication device. The image or video can be viewed on the mobile communication device and transmitted to others. However, presently mobile communication devices only support one type of communication at a time. Thus, there is a need for a means by which users may change modes of communication or use more than one mode of communication at a time, in a seamless manner.

DETAILED DESCRIPTION OF THE PREFERRED EMBODIMENT

Figure 1:
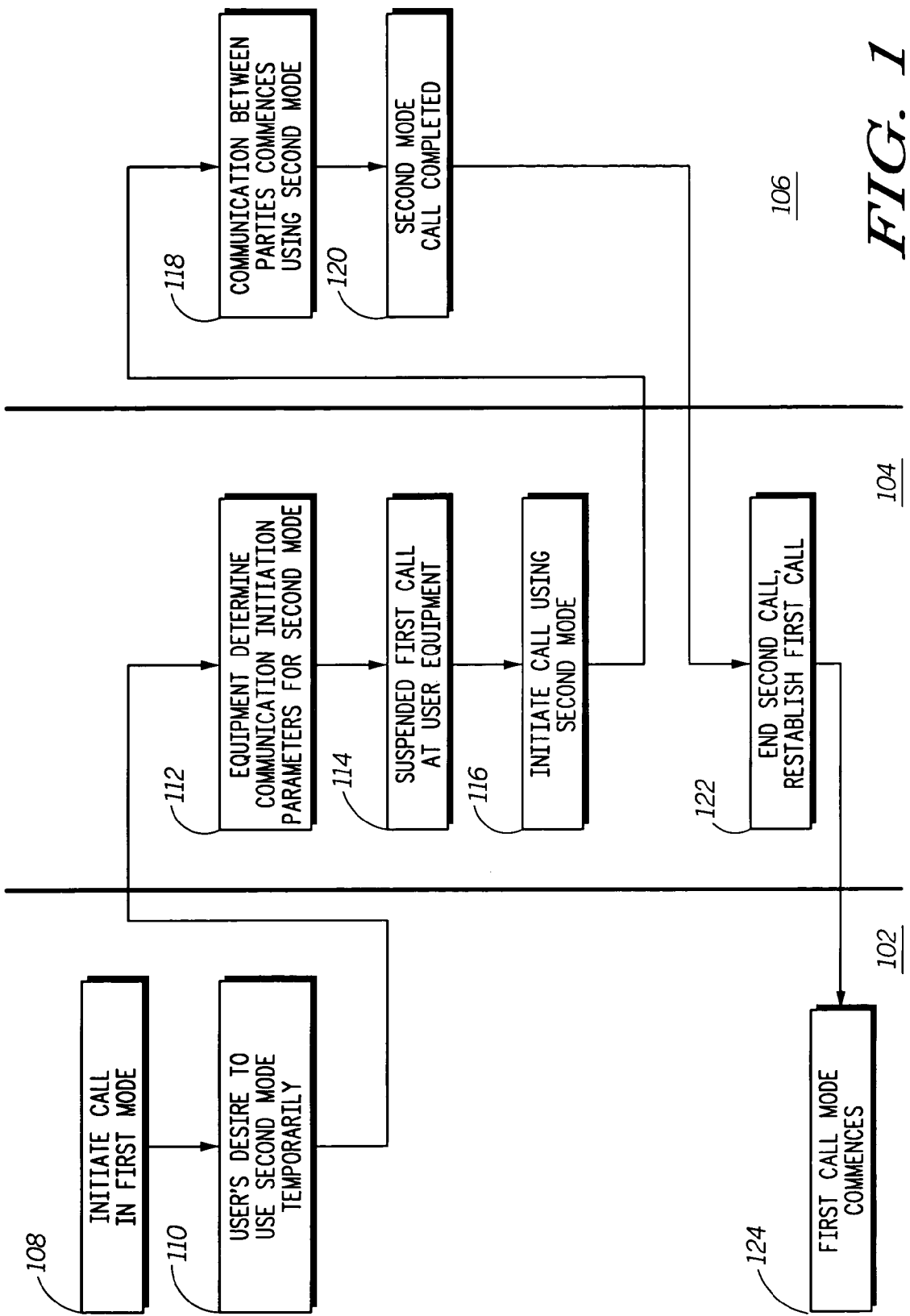
FIG. 1 shows a process chart of a method of performing mixed mode personal communication in accordance with the invention.

While the specification concludes with claims defining the features of the invention that are regarded as novel, it is believed that the invention will be better understood from a consideration of the following description in conjunction with the drawing figures, in which like reference numerals are carried forward.

The invention solves the problem of forcing a user of a mobile communication device to the use of a single mode of communicating at a given time by allowing the use of multiple modes of communication so that if the user decides that a different or additional communication mode would be desirable while communicating with a second party, the other communication mode can be used without losing contact with the second party. For example, a person using a mobile communication device designed in accordance with the invention may initiate a voice call to a second party, and while engaged in the voice call, transfer an image file to the second party using a data mode of communication. The invention contemplates that the use of multiple modes of communication can be performed by either suspending the first mode while engaging in the second mode, and reestablishing the first mode when the second mode is finished, or both modes may be used at the same time.

Referring now to FIG. 1, there is shown a process chart 100 for a method of performing mixed mode personal communication, in accordance with one embodiment of the invention. There are three columns shown. The first column 102 shows the processes associated with a first communication mode. The second column 104 shows the processes associated with the automatic initialization of a second communication mode. The third column 106 shows the processes associated with communicating using the second communication mode.

Initially a first communication link is established 108 between a first party and a second party using a first mode of communication. For example, the first party may call the second party using a standard telephony mode of communication, or a dispatch mode of communication. As is known in the art, a telephony call is a full duplex voice call, while a dispatch call is a half duplex calling mode where only one of the parties involved can speak at a given time. This means that the infrastructure equipment support the first mode of communication establishes a session or link between the parties and reserves communication resources for the communication while the communication is in progress. During that communication session, or call, the users desire to temporarily use a second communication mode. This may be, for example, to switch from a dispatch mode of operation to a full duplex call, or to switch from a dispatch mode to a data exchange mode. There are numerous modes of communicating, and there are as many, if not more, situations in which a different mode may serve a purpose during communication between the parties.

In response, the first user operates the first user's communication equipment, such as a mobile communication device, to engage in the second communication mode 110. For example, the first user may press a button disposed on the first user's mobile communication device to initiate the mixed mode of communicating. The first user's mobile communication device then obtains communication initiation parameters for the second mode of communication 112. This may included obtaining the calling number or phone number of the second party, obtaining an IP or other network address, and so on. There are several means by which this information may acquired. For example, upon the first user indicating to the first user's mobile communication device that mixed mode communication is desired, the first user's mobile communication device may instantiate an application or process that queries the second user's mobile communication device for the information. The query may be sent by a short message service (SMS) message to the second user's mobile communication device. It is contemplated that the first user may inform the second user of the desire to use a second mode of communication in a mixed mode manner, and the second user then operates the second user's mobile communication device to initialize it for mixed mode communication which instantiates an application or process at the second user's mobile communication device to facilitate mixed mode communication. Thus, when the query arrives from the first user's mobile communication device, the second user's mobile communication device automatically responds with the necessary information. It is further contemplated that the querying may be performed using an embedded signaling protocol, where the query is embedded in the digital voice data transmitted to the second user's mobile communication device while engaged in the first mode of communication. Alternatively, it is contemplated that the querying may be performed using a circuit data connection between the first and second mobile communication devices. The querying may also be performed without directly querying the second mobile communication device by querying a database server connected to the communication system which cross references mobile communication device's calling number with their network identifiers, such as IP addresses. The querying may be performed when the first user initiates the first mode of communication, or when the first user initiates the mixed mode of communication after initiating the first mode of communication.

Once the first user's equipment has acquired the requisite information needed to establish a second mode of communication with the second user's mobile communication device the first user's mobile communication device may then automatically suspend the first communication link at the first user's mobile communication device. This may included the call itself being suspended by the infrastructure equipment supporting the link, or that infrastructure equipment may terminate the link. Regardless, the user's equipment treats the first link as if it is suspended 114, and preferably stores the call state and parameters of the first communication mode for use in resuming the first communication mode later. Then, using the call initiation parameters acquired as a result of the querying, the user's equipment commences calling the second user 116 using a second mode of communication. The second user receives the call and communication commences using the second communication mode 118. The second communication mode may be a data communication mode, if the user's desire to exchange or transfer data files, such as images, or the second communication mode may be a different type of voice communication. If the second communication mode is a data communication mode, it is contepompalted that it may be a packet data communication made, such as one using well known TCP/IP protocols. Furthermore, the applications on each mobile communication device maybe used to establish a peer to peer mode where the mobile communication devices act as though directly connected to each other over a data network. It is further contemplated that when the second communication mode is a data communication mode, that the data communication link is used to transfer an image or video file. The image or video file may contain meta data such as, for example, text or a voice tag, which is display or played by the second user's mobile communication device upon being received at the second user's mobile communication device.

One example of how the mixed mode method may work is as follows. The first user's mobile communication device is equipped with a camera. The first user the commences making a dispatch call to a second user. The communication system infrastructure sets up a dispatch communication link between the two users' mobile communication devices. While engaged in the dispatch call, first user decides to transfer an image to the second user. The image may be captured before or during the dispatch call using the camera on the first user's mobile communication device and image capturing software. The first user selects the image to be transferred such as, for example, scrolling through a list of image files, or by simply pointing the camera at whatever the user wishes to send an image of to the second user. The first user then, for example, presses a "send image" button. The software operating on the first user's mobile communication device may configure the mobile communication device such that a "push to talk" button used for dispatch communication acts as a "push to send" button presently, and upon pushing the button, the mobile communication device commences terminating the dispatch call via an in band switch message. The dispatch channel may be deallocated by the communication infrastructure equipment, causing the mobile communication device to return to an idle mode. The transfer application receives the idle mode response and attempts to open a packet data connection to the second user's mobile communication device, and upon connecting, commences transferring the file. Once transfer is complete, as identified by, for example, an acknowledgement, the packet data session is terminated at both ends. The dispatch mode is then reestablished and voice communication may then commence.

Upon completion 120 of the second communication link, the communication equipment ends the second communication mode, and reestablishes the first communication mode (122). The termination is preferably performed by sending an explicit termination message to both the communication infrastructure equipment, and the second user's mobile communication device. Once the second mode of communication is terminated, if a data file was transferred, the second user's mobile communication device can commence displaying the information, such as, for example, by decoding and rendering an image or playing audio information included in the file. This activity may be performed while the first communication mode is reestablished and commences. Thereafter, communication using the first communication mode commences as before. The reestablishment of the first communication mode may be performed by using stored session or state information from the prior use of the first communication mode, or a new call may simply be set up automatically by the first user's mobile communication device. It is contemplated that an image capturing application may be instantiated once the first communication mode is reestablished so that further image capture may commence if desired.

To the users of the communication equipment, this whole process has the experience of being a single communication session where different modes are able to be used at different times during the communication.

Figure 2:
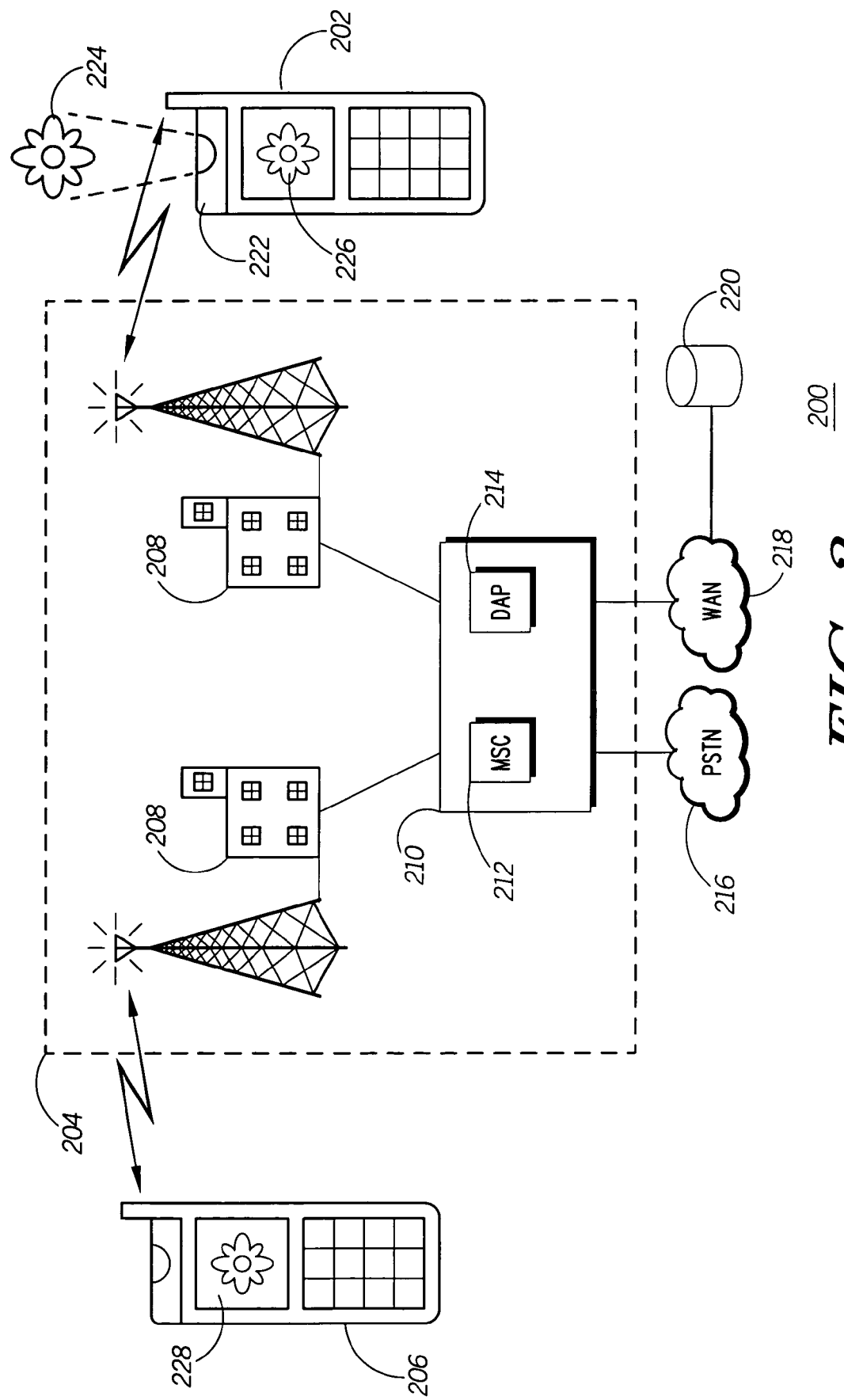
FIG. 2 shows a system diagram of a communication system for supporting mixed mode personal communication in accordance with the invention.

Referring now to FIG. 2, there is shown a system diagram 200 of a communication system for supporting mixed mode personal communication in accordance with the invention. A first mobile communication device 202 is used by a first user. The first mobile communication device communicated with a communication system infrastructure 204 to link to a second mobile communication device 206. The communication system infrastructure includes bases stations 208 which establish service areas in the vicinity of the base station to support wireless mobile communication, as is known in the art. The base stations communicate with a central office 210 which contains call processing equipment for facilitating communication among mobile communication devices and between mobile communication devices and parties outside the communication system infrastructure, such as mobile switching center 212 for processing mobile telephony calls, and a dispatch application processor 214 for processing dispatch or half duplex communication. The central office is further operably connected to a public telephone switching network 216 to connect calls between the mobile communication devices within the communication system infrastructure and telephone equipment out side the system. Furthermore, the central office provides connectivity to a wide area data network 218, which may include connectivity to the Internet. The network 218 may include connectivity to a database server 220 to support querying of user's calling parameters so the when one user desires to engage in mixed mode communication, the server facilitates automatic call setup by, for example, cross referencing calling numbers with network identifiers such as IP addresses. Thus, while a first user is engaged in, for example, dispatch communication with a second user, the first user's mobile communication device 202 may use the dispatch identifier of the second user to cross reference on the server 220 and acquire the second user's IP address to establish a packet data session with the second user as part of a mixed mode communication.

In one embodiment of the invention the mobile communication device 202 comprises an image capturing means, such as a camera 222 for capturing an image of an object 224 and displaying the image 226 on a display of the mobile communication device. Using the present mixed mode method, the user of the first mobile communication device can transmit the image to a the second mobile communication device, where the second mobile communication device will provide a rendered image 228 on the display of the second mobile communication device to be viewed by the user of the second mobile communication device.

Figure 3:
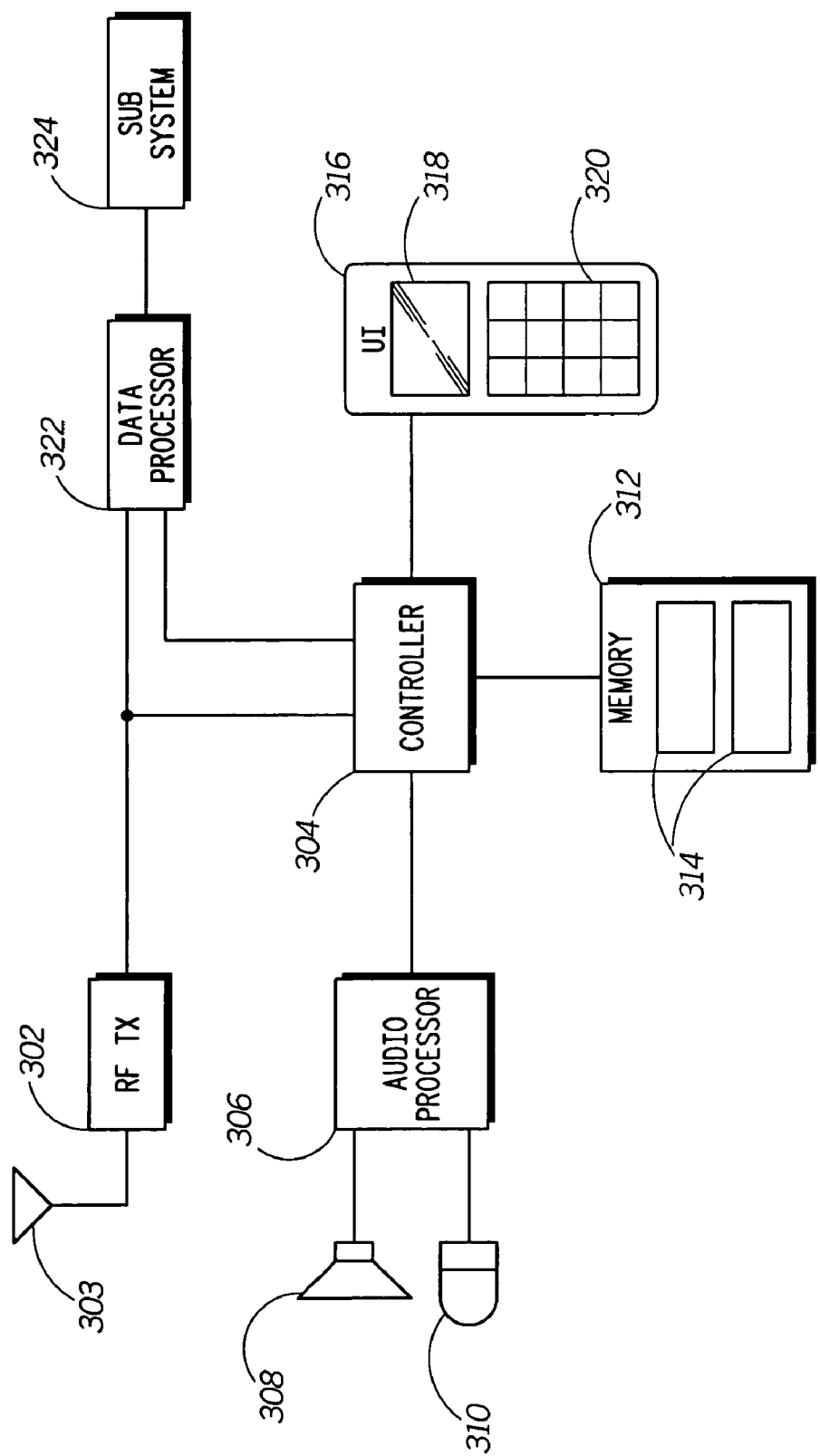
FIG. 3 shows a schematic block diagram of mobile communication device designed for use in accordance with the invention.

Referring now to FIG. 3, there is shown a schematic block diagram 300 of mobile communication device designed for use in accordance with the invention. The mobile communication device comprises a radio frequency transceiver 302 for communicating with the communication system infrastructure equipment via radio frequency signals over an antenna 303. The operation of the mobile communication device and the transceiver is controlled by a controller 304. The mobile communication device also comprises an audio processor 306 which processes audio signals received from the transceiver to be played over a speaker 308, and it processes signals received from a microphone 310 to be delivered to the transceiver. The controller operates according to instruction code disposes in a memory 312 of the mobile communication device. Various modules 314 of code are used for instantiating various functions, including the present mixed mode of communication. To allow the user to operate the mobile communication device, and receive information from the mobile communication device, the mobile communication device comprises a user interface 316, including a display 318 and keypad 320. Furthermore, it is contemplated that the mobile communication device may comprise additional data processing means 322 for supporting a subsystem 324 attached to the mobile communication device or integrated with the mobile communication device, such as, for example, a camera. The data processor, under control by the controller, can operate the subsystem to acquire information and provide it to the transceiver for transmission.

Thus the invention comprises a method of performing mixed mode communication between a first party using a first communication device and second party using a second communication device. The method commences by establishing a communication link between the first and second parties using a first communication mode. While the first mode of communication is commencing, the user's decide to use a second mode of communication. Thus the mobile communication device receives an input from the first party to establish a second communication link using a second communication mode. In a first alternative embodiment, the first mobile communication device commences suspending the first communication mode at the first and second parties' communication equipment automatically in response to the input. However, it is contemplated that the first and second communication modes may be used at the same time, in which case the first communication mode would not be suspended. The mobile communication devices then commence a second communication link between the first and second parties. When the purpose of the second communication mode has been served, and the parties no longer require its use, the mobile communication device commences terminating the second communication link. Upon terminating the second communication link, the mobile communication devices commence reestablishing a communication link using the first mode of communication.

The invention also contemplates a method of binding a voice communication mode with a data communication mode during a communication session between a first party using a first communication device and a second party using a second communication device, wherein at least the first communication device has an image capturing means. In this embodiment of the invention the method commences by establishing a voice communication link between the first and second communication devices using a voice communication mode and instantiating an application on the first communication device for binding the voice communication mode with the data communication mode. When the user of the first communication device is ready to transfer the image, the communication device receives an input form the user to establish a data communication link using the data communication mode. The first party's communication device then may commence suspending the voice communication link, or it may proceed with both links at the same time. Once the data link is established the first communication device commences transferring the data file to the second mobile communication device from the first mobile communication device using the data communication mode, and when finished, automatically resuming the voice communication link. The suspending, transferring, and resuming are integrated under control of the application.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of performing mixed mode communication between a first party using a first mobile communication device and second party using a second mobile communication device, comprising:

establishing a communication link between the first and second mobile communication devices using a first communication mode;
receiving an input from the first party at the first mobile communication device to establish a second communication link using a second communication mode with the second mobile communication device;
suspending the first communication mode at the first and second mobile communication devices automatically in response to the input;
commencing a second communication link between the first and second mobile communication devices, performed by the first mobile communication device calling the second mobile communication device using a second communication mode;
terminating the second communication link; and
upon terminating the second communication link, reestablishing a communication link using the first mode of communication.

2. A method of performing mixed mode communication as defined in claim 1, wherein receiving an input from the first part generates an explicit termination which commences the suspending the first communication mode.

3. A method of performing mixed mode communication as defined in claim 1, wherein receiving an input from the first party generates an in-band switch message which commences the suspending the first communication mode.

4. A method of performing mixed mode communication as defined in claim 1, wherein suspending the first communication mode comprises retaining state session information to be used subsequently in commencing the reestablishing the communication link using the first mode of communication.

5. A method of performing mixed mode communication as defined in claim 1, wherein establishing the communication link using the first communication mode is performed by a half duplex dispatch calling mode of communication.

6. A method of performing mixed mode communication as defined in claim 1, wherein establishing the communication link using the first mode of communication is performed by at full duplex telephony mode of communication.

7. A method of performing mixed mode communication as defined in claim 1, wherein commencing the communication link using the second communication mode is performed by a data calling mode of communication.

8. A method of performing mixed mode communication as defined in claim 7, wherein the data calling mode of communication is performed using packet data.

9. A method of performing mixed mode communication as defined in claim 7, wherein the data calling mode of operation is performed using a TCP/IP protocol.

10. A method of performing mixed mode communication as defined in claim 7, wherein the data calling mode of operation is performed using a peer to peer protocol.

11. A method of performing mixed mode communication as defined in claim 1, wherein the second communication mode comprises transferring an image file from the first mobile communication device to the second mobile communication device.

12. A method of performing mixed mode communication as defined in claim 11, wherein the image file includes meta data.

13. A method of performing mixed mode communication as defined in claim 12, wherein the meta data includes text.

14. A method of performing mixed mode communication as defined in claim 12, wherein the meta data includes a voice tag.

15. A method of performing mixed mode communication as defined in claim 11, further comprising, at the second mobile communication device, upon reestablishing the communication link using the first mode of communication, decoding the image at the second mobile communication device while commencing communication using the first mode of communication.

16. A method of performing mixed mode communication as defined in claim 11, further comprising, at the second mobile communication device, upon reestablishing the communication link using the first mode of communication, rendering the image at the second mobile communication device while commencing communication using the first mode of communication.

17. A method of performing mixed mode communication as defined in claim 1 further comprising querying a network identifier of the second mobile communication device prior to commencing the second communication mode.

18. A method of performing mixed mode communication as defined in claim 17, wherein the querying is performed upon first establishing the communication link using the first mode of communication.

19. A method of performing mixed mode communication as defined in claim 17, wherein the querying is performed using circuit data mode of communication.

20. A method of performing mixed mode communication as defined in claim 17, wherein the querying is performed using an embedded signaling protocol.

21. A method of performing mixed mode communication as defined in claim 17, wherein the querying is performed using a short message service message.

22. A method of performing mixed mode communication as defined in claim 17, wherein the querying comprises requesting the network identifier from the second mobile communication device.

23. A method of performing mixed mode communication as defined in claim 17, wherein the querying comprises requesting the network identifier of the second mobile communication device from a server.

24. A method of performing mixed mode communication as defined in claim 1, wherein terminating the second communication link is performed by sending an explicit termination message.

25. A method of performing mixed mode communication as defined in claim 1, further comprising, upon establishing the communication link using the first mode of communication, instantiating an application to capture an image via a camera of the first mobile communication device while the first communication link commences.

26. A method of transferring data and supporting a voice call session between a first mobile communication device and a second mobile communication device, comprising:
establishing a voice communication link between the first and second mobile communication devices using a voice communication mode;
receiving an input at the first communication device to establish a second communication link with the second mobile communication device using a data communication mode;
suspending the voice communication mode;
calling the second mobile communication device from the first mobile communication device using the data communication mode;
transferring a data file to the second mobile communication device from the first mobile communication device using the data communication mode; and automatically resuming the voice communication mode between the first and second mobile communication devices.

27. A method of transferring data and supporting a voice call session as defined in claim 26, further comprising selecting the data file prior to transferring the data file, and after establishing the voice communication link.

28. A method of transferring data and supporting a voice call session as defined in claim 27, wherein selecting the data file includes capturing an image at the first mobile communication device by means of a camera of the first mobile communication device, and wherein the image is the data file.

29. A method of transferring data and supporting a voice call session as defined in claim 26, further comprising querying a network identifier of the second mobile communication device prior to commencing the data communication mode.

30. A method of transferring data and supporting a voice call session as defined in claim 29, wherein the querying comprises requesting the network identifier from the second mobile communication device.

31. A method of transferring data and supporting a voice call session as defined in claim 30, wherein the querying is performed automatically by the first mobile communication device by embedding the query in the voice communication link.

32. A method of transferring data and supporting a voice call session as defined in claim 30 wherein the querying is performed automatically upon first commencing the voice communication link.

33. A method of transferring data and supporting a voice call session as defined in claim 30, wherein the querying comprises requesting the network identifier of the second mobile communication device from a server.

34. A method of binding a voice communication mode with a data communication mode during a communication session between a first party using a first mobile communication device and a second party using a second mobile communication device, at least the first mobile communication device having an image capturing means, the method comprising:
  establishing a voice communication link between the first and second mobile communication devices using a voice communication mode;
  instantiating an application on the first mobile communication device for binding the voice communication mode with the data communication mode;
  receiving an input at the first mobile communication device to establish a data communication link using the data communication mode;
  suspending the voice communication link;
  transferring a data file to the second mobile communication device from the first mobile communication device using the data communication mode; and
  automatically resuming the voice communication link;
  wherein the suspending, transferring, and resuming are integrated under control of the application.

35. A method of binding a voice communication mode with a data communication mode as defined in claim 34, wherein receiving he input comprises receiving an input at a share button of the first communication device.

36. A method of binding a voice communication mode with a data communication mode as defined in claim 34, wherein the application facilitates the first party in capturing an image in an image file via the image capture means of the first mobile communication device while commencing voice communication mode, and wherein the image file is the data filed transferred via the data communication mode.

37. A method of binding a voice communication mode with a data communication mode as defined in claim 36, further comprising appending meta data to the image file.

38. A method of binding a voice communication mode with a data communication mode as defined in claim 37, wherein the meta data includes text.

39. A method of binding a voice communication mode with a data communication mode as defined in claim 37, wherein the meta data includes a voice tag.

40. A method of binding a voice communication mode with a data communication mode as defined in claim 34, further comprising, upon terminating the data communication mode and resuming the voice communication link, rendering the data file at the second mobile communication device while commencing the voice communication mode.

41. A method of binding a voice communication mode with a data communication mode as defined in claim 34, further comprising, upon terminating the data communication mode and resuming the voice communication link, decoding the data file at the second mobile communication device while commencing the voice communication mode.

42. A method of performing mixed mode communication between a first party using a first mobile communication device and second party using a second mobile communication device, comprising:
  establishing a communication link between the first and second mobile communication devices using a first communication mode;
  receiving an input from the first party at the first mobile communication device to establish a second communication link using a second communication mode;
  commencing a second communication link between the first and second mobile communication devices using a second communication mode while maintaining the first communication mode, performed by calling the second mobile communication device from the first mobile communication device using the second communication mode; and
  terminating the second communication link while maintaining the first communication mode.

* * * * *